United States Patent
Kronsteiner et al.

(10) Patent No.: US 12,339,069 B2
(45) Date of Patent: Jun. 24, 2025

(54) HEAT EXCHANGER FOR AN INTERNAL COMBUSTION ENGINE COMPRISING A DEFORMATION IN A JOINING REGION OF TWO SEPARATING WALLS, METHOD FOR PRODUCING A HEAT EXCHANGER AND INTERNAL COMBUSTION ENGINE COMPRISING A HEAT EXCHANGER

(71) Applicant: Bayerische Motoren Werke Aktiengesellschaft, Munich (DE)

(72) Inventors: Gerd Kronsteiner, St. Ulrich/Steyr (AT); Gernot Woitsch, St. Ulrich bei Steyr (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 156 days.

(21) Appl. No.: 17/928,514

(22) PCT Filed: Jun. 30, 2021

(86) PCT No.: PCT/EP2021/068006
§ 371 (c)(1),
(2) Date: Nov. 29, 2022

(87) PCT Pub. No.: WO2022/022935
PCT Pub. Date: Feb. 3, 2022

(65) Prior Publication Data
US 2023/0204306 A1    Jun. 29, 2023

(30) Foreign Application Priority Data
Jul. 31, 2020   (DE) .................... 10 2020 120 330.6

(51) Int. Cl.
*F02M 26/32* (2016.01)
*F28D 9/00* (2006.01)
(Continued)

(52) U.S. Cl.
CPC ......... *F28D 21/0003* (2013.01); *F02M 26/32* (2016.02); *F28D 9/0037* (2013.01);
(Continued)

(58) Field of Classification Search
CPC .............. F28D 9/0037; F28D 21/0003; F28D 2021/008; F28F 9/001; F28F 9/0219;
(Continued)

(56) References Cited

U.S. PATENT DOCUMENTS

| 4,125,153 A | 11/1978 | Stoneberg |
| 2003/0010480 A1* | 1/2003 | Shibagaki ............... F28F 3/025 165/157 |

(Continued)

FOREIGN PATENT DOCUMENTS

| DE | 100 19 268 A1 | 12/2001 |
| DE | 10 2016 210 261 A1 | 12/2017 |

(Continued)

OTHER PUBLICATIONS

Machine translation of JP 2019-44756, retrieved Aug. 23, 2024 (Year: 2024).*

(Continued)

*Primary Examiner* — Eric S Ruppert
*Assistant Examiner* — Hans R Weiland
(74) *Attorney, Agent, or Firm* — Crowell & Moring LLP

(57) ABSTRACT

A heat exchanger includes a housing wall and interior having a fluid inlet region for introducing a first fluid into the interior, and at least two partition walls substantially accommodated in the interior and connected to the housing wall at (Continued)

at least one connection region. The partition walls border a fluid receiving chamber, through which a second fluid flows in order to separate the fluids from one another. The partition walls are connected to one another at a joining region and also have a deformation in a joining sub-region of the joining region spaced apart from the connection region, which is provided to reduce mechanical tension in the connection region due to a temperature-dependent change in length of the joining region.

8 Claims, 3 Drawing Sheets

(51) Int. Cl.
  *F28D 21/00* (2006.01)
  *F28F 9/02* (2006.01)
  *F28F 9/18* (2006.01)
(52) U.S. Cl.
  CPC ............ *F28F 9/0219* (2013.01); *F28F 9/182* (2013.01); *F28D 2021/008* (2013.01); *F28F 2265/26* (2013.01)
(58) Field of Classification Search
  CPC ........ F28F 9/0221; F28F 9/0248; F28F 9/182; F28F 2265/26
  See application file for complete search history.

(56) References Cited

U.S. PATENT DOCUMENTS

| | | | | |
|---|---|---|---|---|
| 2019/0186434 A1* | 6/2019 | Brezowsky | ........... | F28F 21/062 |
| 2020/0018266 A1* | 1/2020 | Yoon | ........................ | F28F 1/022 |
| 2020/0033074 A1* | 1/2020 | Benjamin | .............. | F02M 26/32 |
| 2020/0333080 A1* | 10/2020 | Nakamura | ............ | F28D 9/0037 |

FOREIGN PATENT DOCUMENTS

| | | | |
|---|---|---|---|
| EP | 3 150 950 A1 | | 4/2017 |
| JP | 2019044756 A | * | 3/2019 |
| KR | 10-2017-0115209 A | | 10/2017 |
| WO | WO 2019/131571 A1 | | 7/2019 |
| WO | WO 2019/189924 A1 | | 10/2019 |

OTHER PUBLICATIONS

International Search Report (PCT/ISA/210) issued in PCT Application No. PCT/EP2021/068006 dated Oct. 6, 2021 with English translation (five (5) pages).
German-language Written Opinion (PCT/ISA/237) issued in PCT Application No. PCT/EP2021/068006 dated Oct. 6, 2021 (six (6) pages).
German-language Office Action issued in German Application No. 10 2020 120 330.6 dated Mar. 5, 2021 (five (5) pages).
Korean-language Office Action issued in Korean Application No. 10-2022-7041399 dated Sep. 30, 2024 with English translation (10 pages).

* cited by examiner

HEAT EXCHANGER FOR AN INTERNAL COMBUSTION ENGINE COMPRISING A DEFORMATION IN A JOINING REGION OF TWO SEPARATING WALLS, METHOD FOR PRODUCING A HEAT EXCHANGER AND INTERNAL COMBUSTION ENGINE COMPRISING A HEAT EXCHANGER

BACKGROUND AND SUMMARY

The invention relates to a heat exchanger for an internal combustion engine for transferring heat between at least two fluids. Further aspects of the invention relate to a method for producing a heat exchanger and to an internal combustion engine having a heat exchanger.

Heat exchangers of this type, also referred to as heat transfer units, serve for transferring heat between fluids. For example, to cool engine oil of an internal combustion engine, it is common to use so-called oil-coolant heat exchangers. Upon a cold start of the internal combustion engine, these oil-coolant heat exchangers can also be used for warming the engine oil, and the so-called warm-up of the internal combustion engine can thus be expedited. Heat exchangers for internal combustion engines can also directly contribute to operation of the internal combustion engine with low untreated emissions. One example of this is cooled exhaust-gas recirculation, also abbreviated to EGR, in the case of which a partial quantity of an exhaust gas emitted during the operation of the internal combustion engine is extracted from an exhaust-gas tract of the internal combustion engine, is cooled by means of a heat exchanger configured as an EGR cooler, and is subsequently fed into an intake tract of the internal combustion engine. This cooled partial quantity of the exhaust gas subsequently enters respective combustion chambers of the internal combustion engine and serves as a so-called ballast gas during the combustion of an air-fuel mixture, whereby untreated NOx emissions can be significantly reduced.

DE 10 2016 210 261 A1 discloses a heat exchanger for exchanging heat between a first fluid and a second fluid, wherein the first fluid can flow through the heat exchanger from a first end side to a second end side. The heat exchanger has at least two partition plates by means of which mutually separate flow regions within the heat exchanger for the first fluid and the second fluid are delimited with respect to one another. At at least one of the end sides of the heat exchanger, at least two adjacent partition plates have in each case one connecting region in which said partition plates are connected to one another by way of a connection. The connection has at least one recess at the end side.

It is an object of the present invention to provide a heat exchanger, a method and an internal combustion engine of the type mentioned in the introduction, which allow particularly failure-resistant heat transfer between fluids.

This object is achieved by means of a heat exchanger, by means of a method, and by means of an internal combustion engine, having the features of the independent claims. Advantageous embodiments with expedient refinements of the invention are specified in the dependent claims.

A first aspect of the invention relates to a heat exchanger for an internal combustion engine for transferring heat between at least two fluids, having at least one housing which has at least a housing wall and a housing interior which is at least regionally delimited by way of the housing wall and which has a fluid inlet region for the introduction of a first fluid of the at least two fluids into the housing interior and a fluid outlet region for the discharge of the first fluid from the housing interior, having at least two partitions which are accommodated at least predominantly in the housing interior and which are connected at at least a connecting region to the housing wall of the housing and which, for the purposes of separating the fluids from one another, at least regionally delimit a fluid-receiving space through which a second fluid of the at least two fluids can flow, wherein the at least two partitions are connected to one another at least at a joining region which is assigned to the fluid inlet region and which adjoins the fluid-receiving space in a fluid main flow direction of the first fluid.

The fluids may for example be exhaust gas and coolant, in particular cooling water. The first fluid may for example be exhaust gas, whereas the second fluid may be coolant. The fluid outlet region may be situated opposite the fluid inlet region in the main flow direction of the first fluid. The expression "fluid main flow direction" is to be understood to mean the flow direction of the first fluid in which the first fluid can predominantly flow during the intended use of the heat exchanger.

During the intended use of the heat exchanger, the first fluid enters the housing interior at the fluid inlet region and exits the housing interior at the fluid outlet region. Furthermore, during the intended use of the heat exchanger, the second fluid is conducted and thus accommodated in the fluid-receiving space. In order to achieve the greatest possible heat transfer coefficients, it is particularly advantageous for the fluids to be conducted through the heat exchanger so as to generate a respective turbulent flow both of the first fluid and of the second fluid. Between the fluid inlet region and the fluid outlet region, efficient heat transfer between the first fluid and the second fluid conducted in the fluid-receiving space is then possible through the respective partitions.

The fluid main flow direction may be oriented in a direction of longitudinal extent of the heat exchanger. It is thus possible for the fluid outlet region to be situated opposite the fluid inlet region in a direction of longitudinal extent of the heat exchanger. The fluid-receiving space may extend between the at least two partitions, whereby the second fluid, which can be conducted in the fluid-receiving space, can effectively and reliably be kept separate from the first fluid. The heat transfer between the two fluids can take place in particular by heat conduction through the respective partitions. In particular, the first fluid can flow along sides of the fluid-receiving space which are situated opposite one another perpendicularly with respect to the fluid main flow direction (of the first fluid), that is to say for example on the left and on the right of the fluid-receiving space as viewed along the fluid main flow direction, and in so doing exchange heat, via the respective partitions, with the second fluid that is conducted in the receiving space. The statement that the at least two partitions at least regionally delimit the fluid-receiving space is to be understood to mean that the fluid-receiving space may be delimited not exclusively by the partitions but for example also regionally by the housing wall.

The assignment of the joining region to the fluid inlet region may be understood to mean that the joining region may be situated at least in the vicinity of the fluid inlet region, that is to say for example may face toward the fluid inlet region, and may additionally or alternatively be arranged in the fluid inlet region.

According to the invention, provision is made whereby, at least in a joining sub-region, which is spaced apart from the connecting region, of the joining region, the at least two partitions have at least one deformation which is provided for at least reducing mechanical stresses at the at least one connecting region resulting from a temperature-induced change in length of the joining region. This is advantageous because, in this way, it is possible for the connecting region to be relieved of load by virtue of the fact that the temperature-induced change in length can be at least substantially absorbed by the deformation. Thus, if the temperature-induced change in length of the joining region occurs during the operation of the heat exchanger by virtue of the first fluid impinging at a particularly high fluid temperature, and/or with a high transient fluid flow velocity of the first fluid at the fluid inlet region, on the joining region and thus intensely heating the joining region, the change in length can, so to speak, be at least substantially, that is to say predominantly, compensated by the deformation, whereby the mechanical stresses at the connecting region resulting from the change in length can be considerably reduced, and therefore at most slight and thus non-detrimental mechanical loading of the connecting region arises. It is thus possible, even in the presence of high fluid temperatures of the first fluid as the latter impinges on the joining region, for a formation of possible stress cracks at the connecting region, and associated leaks, to be avoided, whereby a particularly failure-resistant transfer of heat between the fluids is made permanently possible. The deformation may generally also be referred to as deformation region or alternatively as distorted location. The joining sub-region may generally be understood as a sub-region of the joining region. Accordingly, the deformation need not extend over the entire joining region.

Regions of the at least two partitions which adjoin the at least one joining region in the fluid main flow direction may be free from the at least one deformation. In other words, provision may be made for the deformation to extend only over the joining region, which does not preclude further joining regions, for example a second joining region, which may be spaced apart from the joining region in the fluid main flow direction and which may for example be assigned to the fluid outlet region, from likewise having such a deformation, specifically a second deformation.

The deformation may in principle be plastic in nature, whereby the deformation may be present permanently and independently of the operating state of the heat exchanger. Irrespective of this, the deformation may be configured to be elastically deformable during the temperature-induced change in length of the joining region. This advantageously makes it possible that, during the temperature-induced change in length, at least predominantly, in particular exclusively, the deformation can be elastically deformed, wherein zones of the joining region that are outside the deformation may remain at least substantially uninfluenced by the temperature-induced change in length. In particular, it can be achieved that the temperature-induced change in length is preferably exclusively locally limited to the deformation or—if present—multiple deformations.

The invention is based on the recognition that the connecting region, at which the partitions are connected at least indirectly, preferably directly, to the housing wall, is particularly sensitive to damage resulting from thermal stresses. It has accordingly been recognized that the impingement of the first fluid at a high fluid temperature, in particular with highly transient changes in fluid flow velocity, on the joining region, and the associated temperature-induced change in length of the joining region, can lead to damage to the connecting region. The invention addresses this because, by means of the deformation, an in particular elastic deformation zone is created, to which the temperature-induced change in length can be locally limited.

In one advantageous refinement of the invention, the at least one deformation is configured as a bulge. This is advantageous because the bulge constitutes an embodiment of the deformation that can be produced with particularly little effort. The bulge may for example be generated by means of a targeted shape-imparting exertion of force on the partitions and associated production of the deformation.

In a further advantageous refinement of the invention, the at least one deformation is of undulating form. This is advantageous because the undulating deformation, which can also be referred to as undulating contour or relief undulation, can be elastically deformed particularly uniformly as a result of the temperature-induced change in length. Possible stress peaks during the elastic deformation of the deformation can thus be avoided.

In a further advantageous refinement of the invention, the at least one deformation is oriented in a direction that differs from the fluid main flow direction. It is advantageous here that effective compensation of the temperature-induced change in length is thus possible by way of the deformation. If the deformation is for example of undulating form and is thus configured as an undulation, it is for example possible for an undulation peak of the deformation to be oriented in this direction. The direction may preferably be oriented perpendicularly with respect to the main flow direction and/or perpendicularly with respect to a central plane relative to which the partitions may be oriented at the substantially parallel, whereby particularly effective compensation of the temperature-induced change in length is possible by way of the deformation.

In a further advantageous refinement of the invention, the at least two partitions are distorted in the same direction. This allows reliable sealing of the joining region along the deformation. In other words, the deformation of the partitions may be oriented in the same direction, whereby an occurrence of leaks between the partitions can be reliably avoided despite the deformation.

In a further advantageous refinement of the invention, the at least two partitions are cohesively connected to one another at least at the deformation. Particularly durable sealing of the joining region at the deformation is thus possible. The partitions are preferably cohesively connected to one another along the entire joining region, whereby particularly reliable sealing of the joining region can be achieved.

In general, a gap which is formed between the partitions and which extends along the joining region and thus also along the deformation may have a uniform gap width that is easy to seal off. The gap may for example be filled with a metal solder (for example soldering tin), and the partitions thus joined together at the joining region.

In a further advantageous refinement of the invention, the at least two partitions are connected to the housing wall in the manner of a T-shaped butt joint at the connecting region. This is advantageous because the connection in the manner of a T-shaped butt joint can be produced with particularly little effort in terms of manufacturing. The connection in the form of a T-shaped butt joint can be understood to mean that the two partitions and the housing wall can form a T shape with one another at the connecting region in a section plane that is oriented perpendicular to the fluid main flow direction.

Each of the partitions may have in each case at least one partition region which is oriented along the housing wall and which is preferably oriented away from the joining region and at which the respective partition may be connected preferably cohesively to the housing wall. The partitions may particularly preferably each have at least two mutually opposite partition regions that may each be soldered to the housing wall.

A second aspect of the invention relates to a method for producing a heat exchanger according to the first aspect of the invention, having at least the following steps:
  forming the at least one deformation of the at least two partitions at least in the joining sub-region, and
  joining the at least two partitions at the joining region after the at least one deformation has been formed.

The heat exchanger produced using this method allows particularly failure-resistant heat transfer between the fluids.

The deformation may in principle be formed and thus produced on each individual partition of the at least two partitions. In other words, each of the partitions may be individually distorted, with the deformation thus being produced. The at least two partitions may subsequently be joined.

It is however preferable for the at least two partitions to be jointly distorted, such that individual processing of the individual partitions can be omitted. For this purpose, the at least two partitions may for example be placed against one another such that the at least two partitions are in contact at the joining region, and the at least two partitions may subsequently be jointly distorted, whereby the deformation can be produced jointly on the at least two partitions. The at least two partitions may then be joined at the joining region after the at least one deformation has been formed.

A third aspect of the invention relates to an internal combustion engine having a heat exchanger according to the first aspect of the invention. In the internal combustion engine equipped with said heat exchanger, particularly failure-resistant heat transfer between the fluids is made possible.

In one advantageous refinement of the invention, the heat exchanger is configured as an exhaust-gas cooler of the internal combustion engine. With the heat exchanger configured as an exhaust-gas cooler, in particular as an EGR cooler, particularly failure-resistant heat transfer between exhaust gas, as first fluid, and coolant, as second fluid, is made possible.

The preferred embodiments, and the advantages thereof, presented with regard to one of the aspects apply correspondingly to the respective other aspects of the invention, and vice versa.

The features and feature combinations mentioned above in the description, and the features and feature combinations mentioned below in the description of the figures and/or only shown in the figures, may be used not only in the respectively specified combination but also in other combinations or individually without departing from the scope of the invention.

Further advantages, features and details of the invention will emerge from the claims, from the following description of preferred embodiments, and from the drawings.

The invention will be discussed once again below on the basis of a specific exemplary embodiment.

DETAILED DESCRIPTION OF THE DRAWINGS

Figure 1:
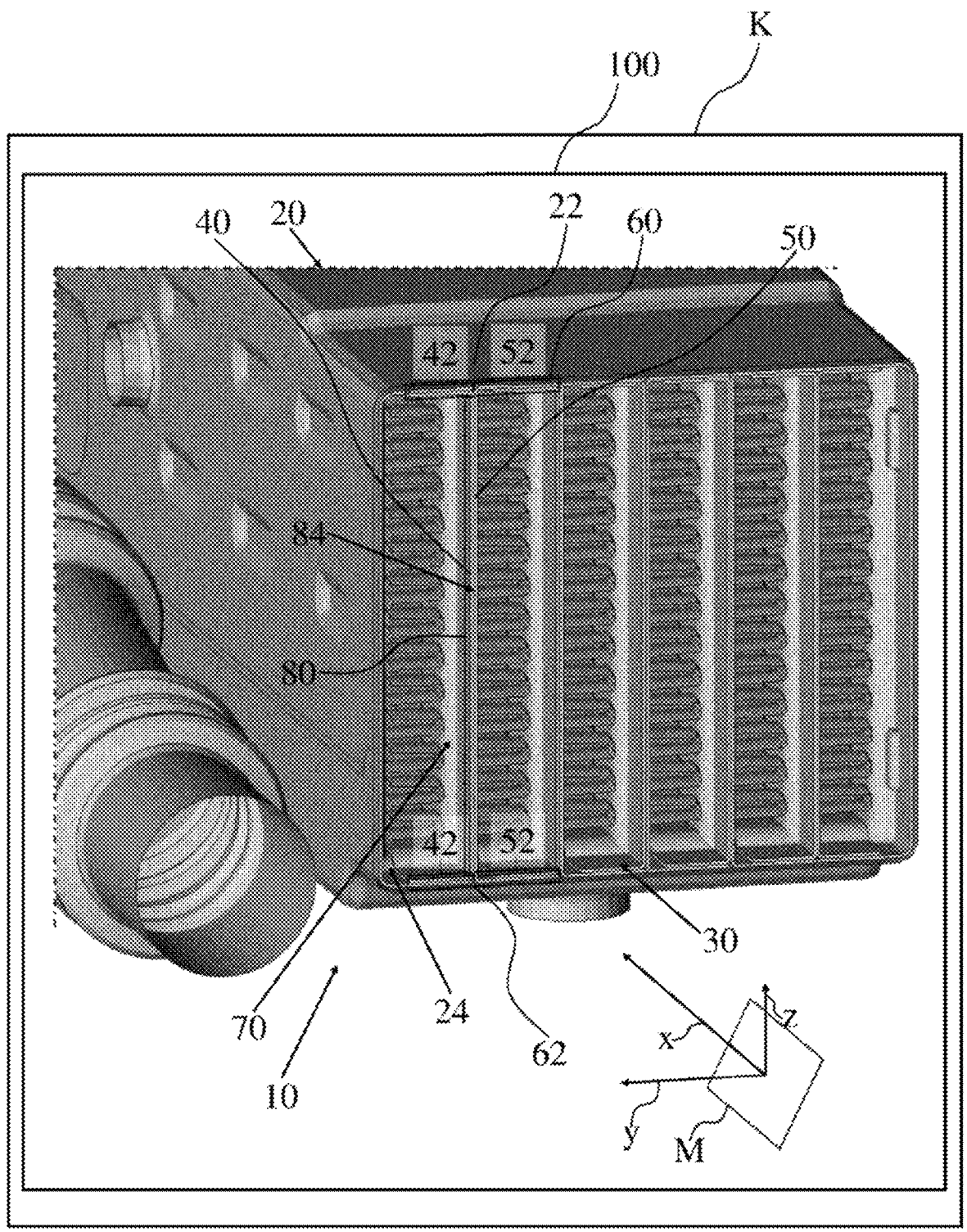
FIG. 1 is a perspective sectional representation of a partially illustrated heat exchanger of an internal combustion engine, which serves for transferring heat between two fluids, of which a first fluid is exhaust gas and a second fluid is coolant of the internal combustion engine, wherein the internal combustion engine, illustrated in highly abstract form, is assigned to a motor vehicle, likewise illustrated in highly abstract form.
Figure 2:
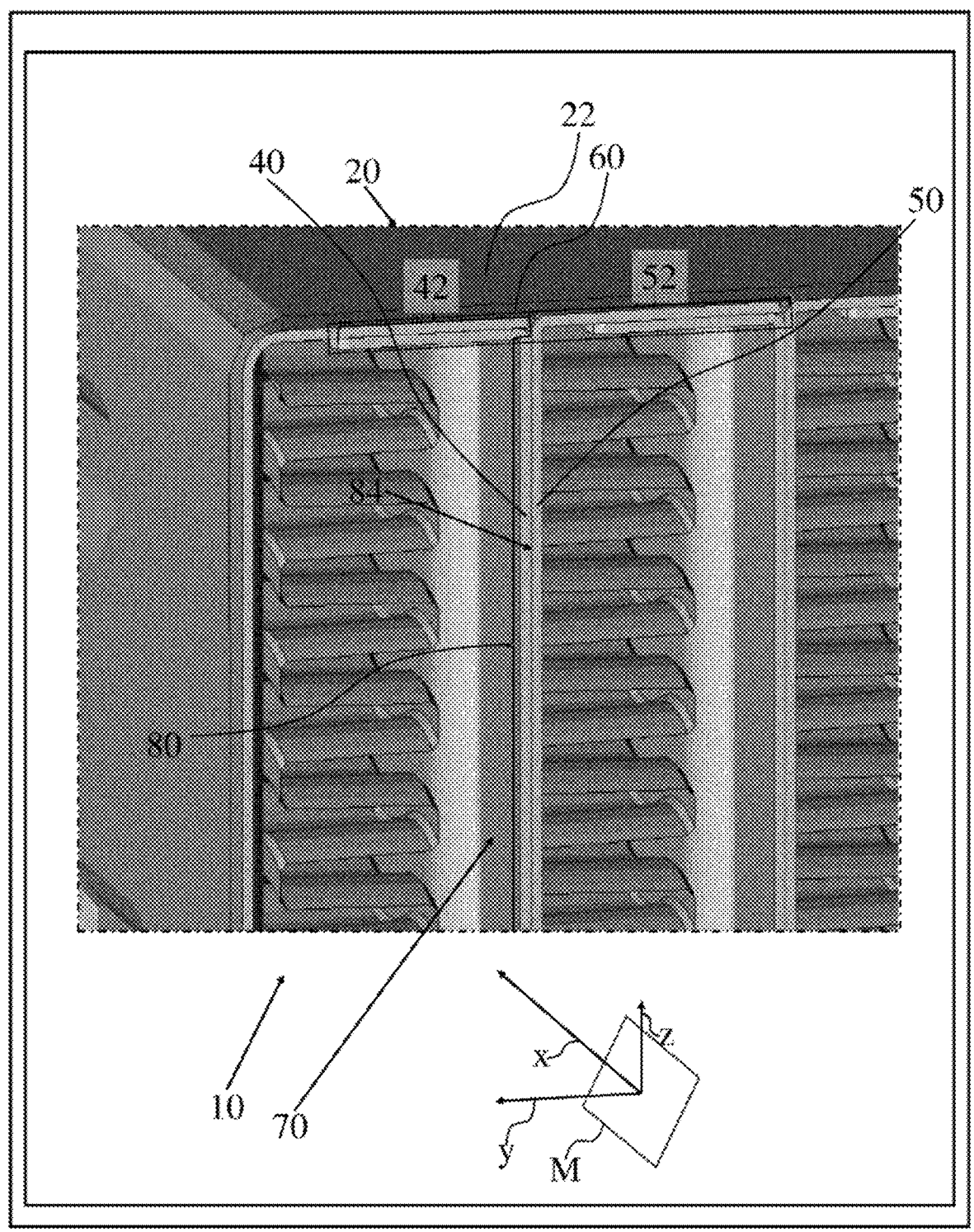
FIG. 2 is an enlarged representation of a segment of the heat exchanger shown in FIG. 1.

FIG. 1 is a schematic representation of a motor vehicle K, with a likewise schematically illustrated internal combustion engine 100 that is configured for driving the motor vehicle K. The internal combustion engine 100 comprises a heat exchanger 10, which is configured as an exhaust-gas cooler, specifically as an EGR cooler of the internal combustion engine 100. So-called cooled exhaust-gas recirculation is thus possible by means of the heat exchanger 10 during the operation of the internal combustion engine 100. FIG. 2 is an enlarged representation of a segment of the heat exchanger shown in FIG. 1.

The heat exchanger 10 serves for transferring heat between two fluids. A first fluid of the two fluids is in the present case exhaust gas, whereas a second fluid of the two fluids is in the present case coolant, for example in the form of a mixture of water and antifreeze.

The heat exchanger 10 (in this case EGR cooler) comprises a housing 20 with at least one housing wall 22. The housing wall is in the present case configured as a sheet-metal part and may also be referred to as cooling jacket plate.

The housing wall 22 peripherally delimits a housing interior 24 of the housing. The housing interior 24 has a fluid inlet region 30 for the introduction of the first fluid into the housing interior 24 and has a fluid outlet region for the discharge of the first fluid from the housing interior 24. The fluid outlet region, which is not shown in any more detail here, is in the present case arranged downstream of the fluid inlet region in a fluid main flow direction x of the first fluid. The fluid main flow direction x corresponds to a direction of longitudinal extent of the heat exchanger 10. In other words, during the intended use of the heat exchanger 10, the first fluid flows through the housing interior 24 in the direction of longitudinal extent of the heat exchanger 10.

As can likewise be seen from FIGS. 1 and 2, the heat exchanger is in the present case configured as a plate-type heat exchanger.

Here, the plates of the heat exchanger 10 are formed by partitions 40, 50 that are connected to one another in pairs, specifically a first partition 40 and a second partition 50, which in the present case are configured as respective sheet-metal half-shells. A plate is thus formed by the first partition 40 and the second partition 50, wherein the heat exchanger 10 has a multiplicity of such plates, as can be seen from FIG. 1. Only a single plate, which is formed by the two partitions 40, 50, will be discussed below, but the following statements also apply in principle to the other plates of the heat exchanger 10.

The partitions 40, 50 are accommodated in the housing interior 24 and connected to the housing wall 22 at connecting regions 60, 62 that are situated opposite one another in a height (vertical) direction z of the heat exchanger 10. Here, the first partition 40 has respective partition regions 42 that are situated opposite one another in the vertical direction z, whereas the second partition 50 has partition regions 52 that are situated opposite one another in the vertical direction z. The respective partition regions 42, 52 are formed integrally on the housing wall 22. In other words, at the corresponding connecting regions 60, 62, the partition regions 42, 52 run at least predominantly parallel to the housing wall 22 and in the present case also to one another, and are connected cohesively, in particular by way of a soldered connection, to the housing wall 22 at the connecting regions 60, 62.

The partitions 40, 50 serve for separating the fluids from one another and at least regionally delimit a fluid-receiving space 70 through which the second fluid (in this case coolant) flows during the intended use of the heat exchanger 10. The fluid-receiving space 70 is also delimited regionally, specifically in the vertical direction z, oriented perpendicularly with respect to the fluid main flow direction x, of the heat exchanger 10, by the housing wall 22. In each of FIGS. 1 to 4, the fluid-receiving space 70 is concealed by the partitions 40, 50 and it is therefore not possible to see into said fluid-receiving space, but it is readily clear how the partitions 40, 50, configured as respective sheet-metal half-shells, can delimit the fluid-receiving space 70. It is accordingly possible for in each case one of the sheet-metal half-shells (partitions 40, 50) to delimit approximately one half of the fluid-receiving space 70.

The pairs of partitions 40, 50 are cohesively connected, and in this case soldered, to one another in each case at least at a joining region 80, which is assigned to the fluid inlet region 30 and which adjoins the fluid-receiving space 70 in the fluid main flow direction x of the first fluid. A gap 84 between the partitions 40, 50, which gap extends over the joining region 80, is in this case filled with metal solder, whereby the partitions 40, 50 are soldered together and the gap 84 is sealed off against an undesired escape of the second fluid (coolant, in particular cooling water) from the fluid-receiving space 70 that extends between the partitions 40, 50. Additionally, the partitions 40, 50 are also connected to one another at a further joining region which is situated opposite the joining region 80 in the fluid main flow direction x and which is assigned to the fluid outlet region, though this is not visible in all of FIGS. 1 to 4, especially as the fluid outlet region is not shown.

At the common joining region 80, the respective partitions 40, 50 are oriented in each case at an angle, specifically in the present case a right angle (90° angle), with respect to the partition regions 42, 52. The partitions 40, 50 are thus connected to the housing wall 22 in the manner of a T-shaped butt joint at the connecting regions 60, 62, as can be seen particularly clearly in FIG. 2.

Figure 3:
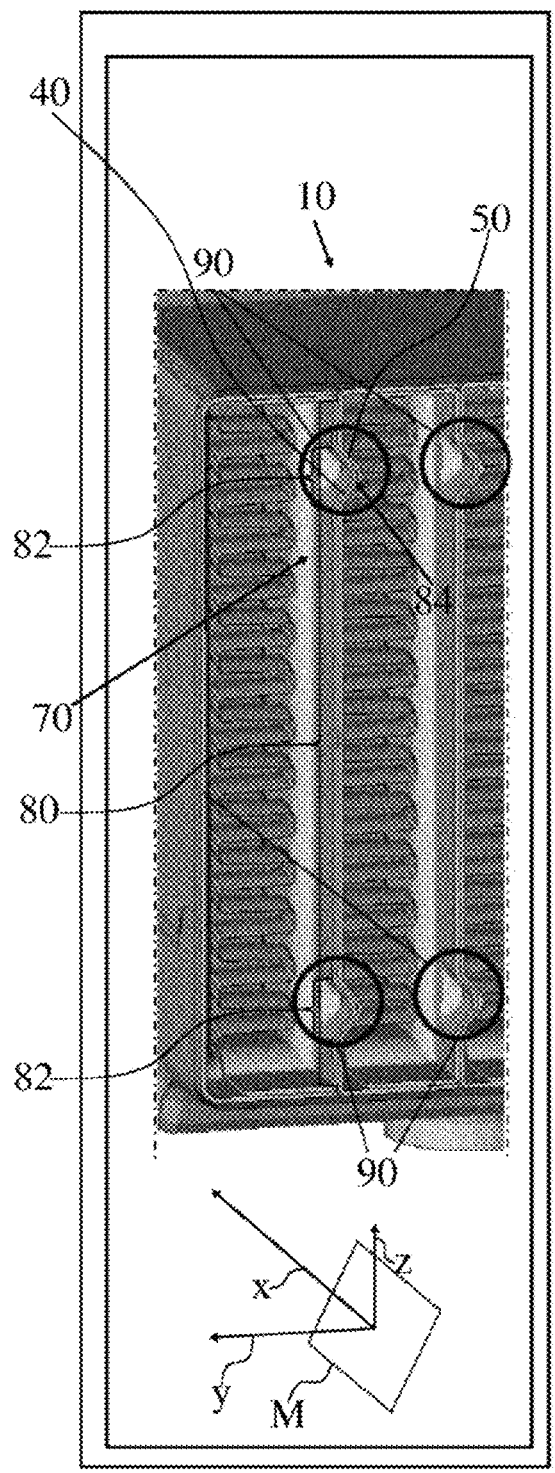
FIG. 3 is an enlarged representation of a partially illustrated variant of the heat exchanger, in which partitions are joined together at a common joining region and have deformations which are provided for at least reducing mechanical stresses resulting from a temperature-induced change in length of the joining region.
Figure 4:
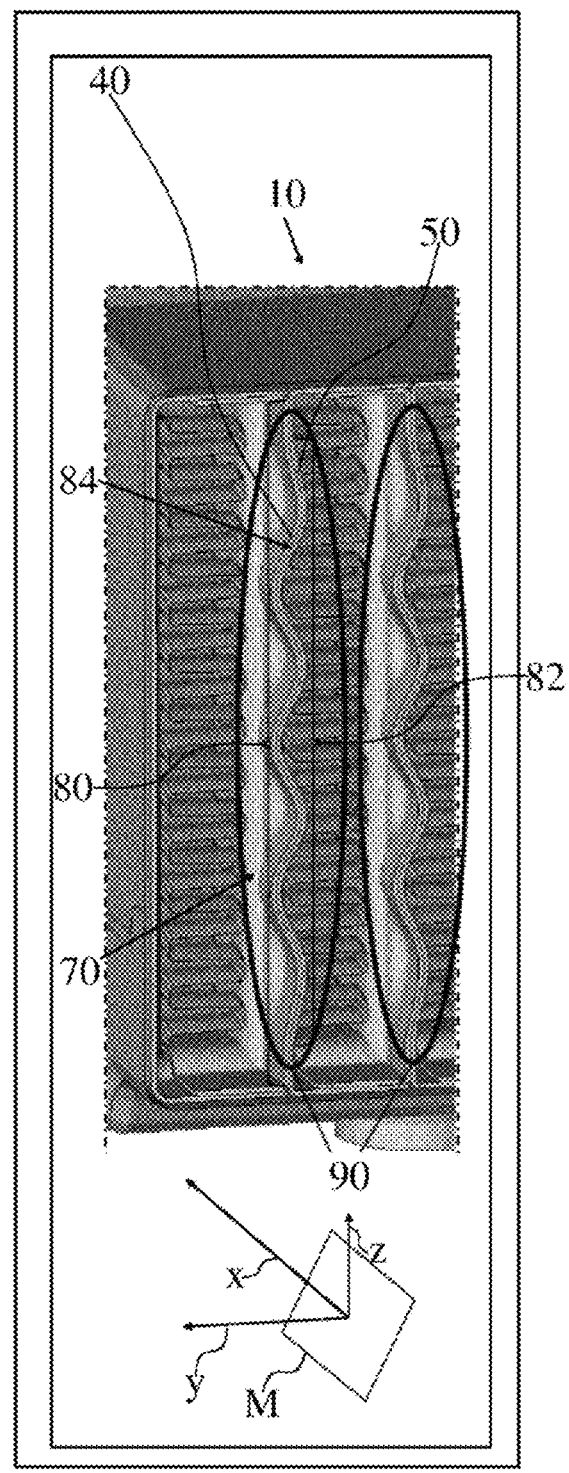
FIG. 4 is an enlarged representation of a further partially illustrated variant of the heat exchanger, in which multiple deformations extend collectively in undulating form over the entire joining region.

FIGS. 3 and 4 show, in each case in a partial enlarged representation of a segment of the heat exchanger 10, that the partitions 40, 50 may have at least one deformation 90 or multiple deformations 90 at least in a joining sub-region 82, spaced apart from the connecting region 60, of the joining region 80. The deformations 90 are outlined by circles in FIG. 3 and by ellipses in FIG. 4 merely for the purposes of highlighting said deformations. The deformations 90 are each provided and configured to at least reduce mechanical stresses at the connecting regions 60, 62 resulting from a temperature-induced change in length of the joining region 80. Particularly failure-resistant heat transfer between the fluids is made possible by means of the deformations 90. Whereas only two deformations 90 are provided at the joining region 80 in the variant shown in FIG. 3, the variant shown in FIG. 4 has a multiplicity of deformations 90, that is to say at least three deformations 90 at the joining region 80, which deformations are distributed preferably uniformly over the joining region 80, making it possible for the temperature-induced change in length to be distributed particularly uniformly across the respective deformations 90. Merely for the sake of clarity, the deformation 90 or deformations 90 have not been shown in FIGS. 1 and 2.

In the present case, the deformations 90 are each configured as undulating bulges. Furthermore, the deformations 90 are oriented in a direction y that differs from the fluid main flow direction x. In the present case, the direction y corresponds to a transverse direction of the heat exchanger 10. It can be seen from FIGS. 3 and 4 that the partitions 40, 50 are distorted in the same direction, such that both partitions 40, 50 are each bulged in the direction y (transverse direction) at the deformations 90.

The direction y is perpendicular to a central plane M relative to which the partitions 40, 50 may be oriented at least substantially parallel. The central plane M is in the present case spanned by the fluid main flow direction x and the vertical direction z.

The fluid main flow direction x (direction of longitudinal extent of the heat exchanger 10), the direction y (transverse direction of the heat exchanger 10) and the vertical direction z are oriented in each case perpendicularly with respect to one another.

The partitions 40, 50 are cohesively connected, specifically soldered, to one another along the entire joining region 80, and thus also at the deformation 90.

In a method for producing the heat exchanger 10, at least the following steps may be performed in order to make particularly failure-resistant heat transfer between the fluids possible during the intended use of the heat exchanger 10. In a first step, the at least one deformation 90 of the at least two partitions 40, 50 is formed at least in the joining sub-region 82. In a subsequent second step, the at least two partitions 40, 50 are joined at the joining region 80 after the at least one deformation 90 has been formed.

During the production of the present heat exchanger 10, the partitions 40, 50 (sheet-metal half-shells) may be joined, in particular soldered, both to one another at the joining region 80 and to the housing wall 22 at the connecting regions 60, 62. Owing to minimum soldering widths in the design of the heat exchanger 10, the connecting regions 60, 62 constitute particularly rigid zones of the heat exchanger 10, in particular at the fluid inlet region 30. By means of the deformation 90 or the deformations 90, inadmissibly high mechanical loading, for example in the form of fluctuating temperature loading, at the connecting regions 60, 62 can be avoided. The deformation(s) 90 prevent(s) the partitions 40, 50, which are connected to the housing wall 22 in the manner of a T-shaped butt joint, from expanding to too great an extent in the vertical direction z, whereby excessive loading of the connecting regions 60, 62 can be avoided even in the presence of a highly transient flow of particularly hot exhaust gas (first fluid) through the housing interior 24. The deformations 90 constitute targeted expansion regions at which the temperature-induced change in length can take place.

The geometrical shaping by way of the deformations 90 of the sheet-metal half-shells (partitions 40, 50) results in a targeted reduction of the rigidity of the sheet-metal half shells in the joining region 80. The deformations 90 thus cause the structure of the soldered sheet-metal half shells to be made locally softer, and the sheet-metal half shells thus have a reduced ability to transmit forces to their edge regions, that is to say to the connecting regions 60, 62, in the presence of fluctuating temperature loading. The connecting regions 60, 62 are thus relieved of load in the presence of fluctuating temperature loading.

LIST OF REFERENCE DESIGNATIONS

- 10 Heat exchanger
- 20 Housing
- 22 Housing wall
- 24 Housing interior
- 30 Fluid inlet region
- 40 First partition
- 42 Partition region
- 50 Second partition
- 52 Partition region
- 60 Connecting region
- 62 Second connecting region
- 70 Fluid-receiving space
- 80 Joining region
- 82 Joining sub-region
- 84 Gap
- 90 Deformation
- 100 Internal combustion engine
- K Motor vehicle
- M Central plane
- x Main flow direction
- y Direction
- z Height (vertical) direction

The invention claimed is:

1. A heat exchanger for an internal combustion engine for transferring heat between at least two fluids, comprising:
    a housing having a housing wall and a housing interior which is at least regionally delimited by the housing wall, and which has a fluid inlet region for introducing a first fluid of the at least two fluids into the housing interior and a fluid outlet region for discharging the first fluid from the housing interior;
    at least two partitions which are accommodated at least predominantly in the housing interior and which are connected to the housing wall of the housing in a connecting region, and which, for purposes of separating the at least two fluids from one another, at least regionally delimit a fluid-receiving space through which a second fluid of the at least two fluids flows, wherein
    the at least two partitions are connected to one another at least at a joining region along edges of each of the at least two partitions which is assigned to the fluid inlet region and which adjoins the fluid-receiving space in a fluid main flow direction of the first fluid, and
    at least in a joining sub-region along the edges of each of the at least two partitions, which is spaced apart from the connecting region, of the joining region, the at least two partitions each have at least one deformation provided for reducing mechanical stresses at the connecting region resulting from a temperature-induced change in length of the joining region,
    wherein the at least one deformation of each of the at least two partitions are deformed in a same direction, and
    wherein the at least two partitions are continuously connected to one another along an entirety of each edge spanning across each of the at least one deformation of each of the at least two partitions.

2. The heat exchanger according to claim 1, wherein the at least one deformation is configured as a bulge.

3. The heat exchanger according to claim 1, wherein the at least one deformation has an undulating form.

4. The heat exchanger according to claim 1, wherein the at least one deformation is oriented in a direction that differs from the fluid main flow direction.

5. The heat exchanger according to claim 1, wherein the at least two partitions are connected to the housing wall as a T-shaped butt joint at the connecting region.

6. A method for producing a heat exchanger having a housing with a housing wall and a housing interior at least regionally delimited by the housing wall, and with a fluid inlet region for introducing a first fluid of at least two fluids into the housing interior and a fluid outlet region for discharging the first fluid from the housing interior, wherein at least two partitions are accommodated at least predominantly in the housing interior and at least regionally delimit a fluid-receiving space through which a second fluid of the at least two fluids flows, wherein the at least two partitions are connectable to one another at least at a joining region along edges of each of the at least two partitions and assigned to the fluid inlet region and adjoining the fluid-receiving space in a fluid main flow direction of the first fluid,
    the method comprising:
    forming at least one deformation of each the at least two partitions at least in a joining sub-region of the joining region along the edges of each of the at least two partitions, the joining sub-region being spaced apart from the connecting region, wherein the at least one deformation is provided for reducing mechanical stresses at the connecting region resulting from a temperature-induced change in length of the joining region, wherein the at least one deformation of each of the at least two partitions are deformed in a same direction; and
    joining the at least two partitions at the joining region after the at least one deformation has been formed such that the at least two partitions are continuously connected to one another along an entirety of each edge spanning across each of the at least one deformation of each of the at least two partitions.

7. An internal combustion engine comprising a heat exchanger according to claim 1.

8. The internal combustion engine according to claim 7, wherein
    the heat exchanger is configured as an exhaust-gas cooler of the internal combustion engine.

* * * * *